United States Patent [19]

Bernert et al.

[11] 3,962,176

[45] June 8, 1976

[54] ANTISTATIC POLYAMIDE COMPOSITIONS WHICH ARE STABILIZED AGAINST YELLOWING

[75] Inventors: Claus-Rüdiger Bernert, Dormagen; Eduard Radlmann, Dormagen-Hackenbroich, both of Germany

[73] Assignee: Bayer Aktiengesellschaft, Leverkusen, Germany

[22] Filed: May 16, 1974

[21] Appl. No.: 470,495

[30] Foreign Application Priority Data

May 16, 1973 Germany............................ 2324689

[52] U.S. Cl................... 260/45.7 R; 260/32.6 N;
 260/45.7 S; 260/45.9 NC; 260/45.95 R;
 260/78 S; 260/DIG. 15; 260/DIG. 19
[51] Int. Cl.²...................... C08K 5/20; C08K 5/41; C08L 77/00
[58] Field of Search.... 260/78 S, 45.9 NC, DIG. 15, 260/DIG. 19, 45.7

[56] References Cited

UNITED STATES PATENTS

| | | | |
|---|---|---|---|
| 3,388,104 | 6/1968 | Crovatt............................. | 260/78 S |
| 3,639,333 | 2/1972 | Baitinger..................... | 260/45.9 NC |
| 3,734,986 | 5/1973 | Kato et al........................ | 260/78 S |
| 3,755,249 | 8/1973 | Fujita et al. ..................... | 260/78 S |
| 3,755,497 | 8/1973 | Weedon et al. .................. | 260/78 S |
| 3,801,521 | 4/1974 | Smith et al. ..................... | 260/78 S |

*Primary Examiner*—Ronald W. Griffin
*Attorney, Agent, or Firm*—Plumley and Tyner

[57] ABSTRACT

This invention relates to antistatic compositions of high molecular weight linear aliphatic polyamides which are stabilized against yellowing due to the action of heat. These polyamides which may be formed into films or fibers, are prepared by the solvent-free condensation of salts of aliphatic diamines with aliphatic dicarboxylic acids and/or lactams and contain homogeneously distributed therein a composition of one or more polyoxyalkylene compounds and tertiary amides or diamides, having at least one tertiary amide group.

9 Claims, No Drawings

ANTISTATIC POLYAMIDE COMPOSITIONS WHICH ARE STABILIZED AGAINST YELLOWING

This invention relates to antistatic compositions of high molecular weight linear aliphatic polyamides which are stabilized against yellowing due to the action of heat. These polyamides which may be formed into films or fibers, are prepared by the solvent-free condensation of salts of aliphatic diamines with aliphatic dicarboxylic acids and/or lactams and contain homogeneously distributed therein a composition of one or more polyoxyalkylene compounds and tertiary amides or diamides, having at least one tertiary amide group.

The amides or diamides may be prepared by the reaction of monocarboxylic acids or their derivatives with secondary amines or primary-secondary or disecondary diamines.

The production of a permanent antistatic finish in high-molecular weight substances by incorporation, copolymerization or cocondensation of polyalkylene oxides or other polyether-containing compounds is known. These antistatic finishes are particularly important in the case of synthetic textile fibers because the clinging of the textiles to the body or to each other and the electric discharges which occur, e.g., when walking on carpets, are found to be particularly unpleasant. Dangerously high electrical charges may also build-up during the production and processing of high-molecular weight polymers, e.g., in sheets of such polymers. This problem has been partly solved in the case of synthetic fibers by the introduction of small quantities of alkoxylated compounds.

The disadvantages of these high-molecular weight polymers which are finished with polyether - containing additives manifest themselves, particularly in the case of aliphatic polyamides, in a reduced resistance to yellowing on exposure to heat, a reduced adherence of dyes to the textiles and a reduction in the output of stretched fibers of low titer due to thread breakages. Moreover, the antistatic additive is also found to bleed out of shaped products, with the result that the products have a greater tendency to attract dirt.

Numerous patent specifications are directed to attempts to obviate these disadvantages. Thus in attempts to prevent bleeding polyether - containing compounds which carry reactive groups have been incorporated into polyamides by condensation. Attempts have also been made to find a solution by finding suitable additives which are free from polyethers, but the problem then arises that antistatic agents which are free from polyethers are less effective than those which contain polyethers. In order to obtain the same reduction in the surface resistance of the polyamides as may be obtained by using polyethers, the quantities of polyether-free antistatic agents used would have to be substantially increased. Thus, for example the carboxylic acid amides employed as antistatic agents according to German Offenlegungsschriften Nos. 1,494,052, 1,494,053 and 1,494,054 and German Auslegeschrift No. 1,243,381 would, in some cases, require to be used in quantities in excess of 10% by weight, in order to produce a sufficient antistatic effect. The addition of such a large quantity of additives, however, has a deleterious effect on numerous other properties of the polymers.

One particular disadvantage of antistatic polyamides which contain polyethers is their tendency to become yellow under the action of heat.

It has now been found that polyether-containing aliphatic polyamides may be stabilized against yellowing by the addition of carboxylic acid amides, which are known antistatic agents, preferably the amides of secondary amines. In some cases the addition of less than 1%, by weight, is sufficient to import this stabilization. It is well known that this level of addition alone is not sufficient to render polyamides permanently antistatic.

It has also been found that a combination of carboxylic acid amides and polyoxyalkylene compounds, even when added in still smaller quantities, will not only reduce the electrical surface resistance sufficiently for practical use but will also have an excellent stabilizing effect against yellowing. One factor which was completely unexpected was that certain carboxylic acid amides and polyoxyalkylene compounds were found to show a synergistic effect in their antistatic properties, i.e., in the presence of the polyethers these carboxylic acid amides are just as effective as the polyethers themselves.

This invention therefore relates to aliphatic polyamides with reduced surface resistance which are stabilized against the yellowing produced by the action of heat, which polyamides have been obtained by the condensation of salts of aliphatic diamines with aliphatic dicarboxylic acids and/or lactams in solvent-free melt and which polyamides contain up to 7 %, by weight, of one or more polyoxyalkylene compounds and from 0.1 to 7 %, by weight, of a carboxylic acid amide of one of the following general formulae:

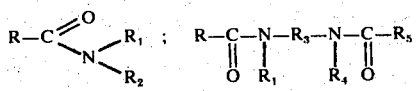

Wherein
R and $R_5$ denote the same or different $C_4 - C_{24}$ alkyl group,
$R_1$ denotes a $C_1 - C_5$ alkyl group,
$R_2$ denotes a $C_6 - C_{24}$ alkyl group,
$R_3$ denotes a $C_1 - C_6$ alkylene group and
$R_4$ denotes hydrogen or a $C_1 - C_5$ alkyl group.

The invention also relates to a process for producing aliphatic polyamide compositions with reduced electrical surface resistance which are stabilized against yellowing due to heat, wherein tertiary amides or diamides which contain at least one tertiary amide group and correspond to one of the following general formulae

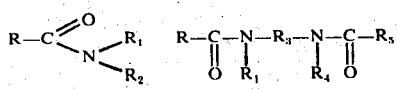

wherein
R, $R_1$, $R_2$, $R_3$, $R_4$, and $R_5$, are as defined above, are added in quantities of from 0.1 to 7 %, by weight, and one or more polyoxyalkylene compounds are added in quantities of up to 7%, by weight, to the polyamides obtained by condensation of salts of aliphatic diamines with aliphatic dicarboxylic acids and/or lactams in the melt, and are homogeneously distributed therein.

The following advantages and improvements compared with the prior art may be obtained according to the present invention:

1. The antistatic polyamide compositions of the present invention are stabilized against yellowing by heat, in spite of the fact that they contain polyoxyalkylene compounds. 2. The polyether content may be reduced without thereby adversely affecting the antistatic characteristics, with the result that disturbances in the spinning and stretching process are eliminated in the production of fibers from these polyamide compositions.
3. The proportion of polyether-free antistatic agent may also be reduced since the antistatic effect of the amide component is increased by the synergistic effect between the polyether and the carboxylic acid amides.

The aliphatic polyamide compositions of the present invention, which are antistatic and stabilized against yellowing, may be used for producing shaped products, in particular fibers and sheets.

The antistatically active polyoxyalkylene compounds may be incorporated into the polyamides, for example, by stirring them into the melt. According to a preferred embodiment of the invention, the polyoxyalkylene compounds are first mixed with the polyamide melt and the mixture is then worked-up to a granulate to which other additives may be added before it is finally used. According to another method which is also particularly advantageous, the polyethers may be added to the monomers before polymerisation is completed, provided that their chemical composition allows this without decomposition. Another method consists of first preparing a concentrate of the polyether in the polyamide with a polyoxyalkylene content of up to 30 %, by weight, and subsequently adding this concentrate to the polyamide melt in the desired concentration.

The tertiary carboxylic acid amides used according to the invention, which stabilize against yellowing and have an enhanced antistatic action due to the synergistic effect, may, in principle, be added to the polyamide in the manner described above. However, it must be taken into account that if the carboxylic acid amides are left too long in the melt they become ineffective due to amide interchange. This is almost invariably the case if a granulate containing both components is first prepared and then the final product is produced from it, because in that case the material must be melted twice.

According to a particularly preferred embodiment of the invention, therefore, a granulate which contains polyether is first prepared and when this is being worked-up into fibers or sheets in an extruder, it is homogeneously mixed with a melt of carboxylic acid amides which is injected into the extruder just before the spinning or sheet — forming stage.

Such an addition of polyethers and carboxylic acid amides may, of course, also be carried out simultaneously by injection into the polyamide melt.

Aliphatic polyamides which are suitable for use as starting materials for producing the present antistatic polyamide compositions which are stabilized against yellowing are linear polyamides or copolyamides which have recurrent structural units corresponding to one of the following general formulae:

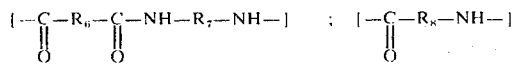

Wherein
R$_6$ denotes a straight or branched chain C$_4$ – C$_{20}$ alkylene group, R$_7$ denotes a straight or branched chain alkylene group, a cyclohexylene group or

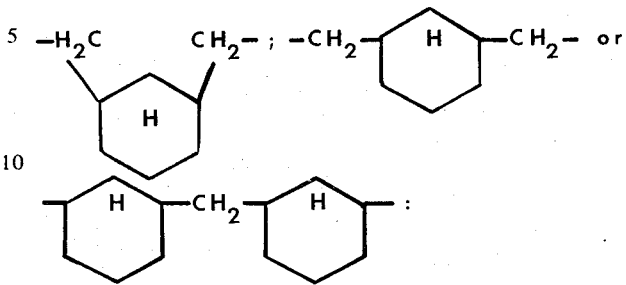

and
R$_8$ denotes a straight or branched chain C$_3$ – C$_{20}$ alkylene group.

Polycaprolactam and polyamide-66 are particularly preferred starting materials for producing the polyamide compositions of the present invention.

Suitable carboxylic acid amides contain at least one tertiary amide group. They may be obtained from C$_4$–C$_{25}$ monocarboxylic acids and secondary amines, with a short chain and a long chain N-alkyl group, or primary secondary diamines or disecondary diamines with one or two short chain N-alkyl groups. The preferred monocarboxylic acids are lauric acid, myristic acid and stearic acid and derivatives thereof which are capable of reacting with amines.

N-methyl-dodecylamine and N-methyl-stearylamine, for example, are suitable secondary amines. The following are examples of diamines which may be used: N-methyl-ethylene diamine, N-methyl-diaminopropane, N-isopropyl-diaminohexane, N-isobutyl-diaminohexane, N,N'-dimethyl-ethylene diamine, N,N'-diethyl-diaminohexane, N,N'-diisopropyl-diaminohexane, N,N'-diisobutyl-diaminohexane, N,N'-dibenzyl-diaminohexane and N,N',N''-trimethyl-diethylene triamine.

Diamides of primary-secondary diamines are particularly suitable because they have a very marked synergistic effect.

The carboxylic acid amides should be present in the polyamide in quantities of from 0.1 to 7 %, by weight, quantities of from 1 to 3 %, by weight, being particularly effective.

The polyoxyalklene compounds used may be any compounds which may be derived from ethylene oxide, propylene oxide or mixtures thereof and which are capable of imparting permanent antistatic properties to polyamides when used on their own in quantities of up to 7 %, by weight. Polyethers of the polyethylene oxide series, however, are preferred because of their particularly powerful effect. Naturally, polyethers which contain functional groups are also suitable for use in the polyamide compositions of the present invention. Examples of these are alkoxylated alcohols, carboxylic acids, amines, phenols or substituted phenols. These may subsequently be reacted at the hydroxyl end group and may contain, for example, nitrile-, amino-, ester-, sulphonate-, sulphate-, amine salt or amide groups as end groups. It has been found that polyethers or polyether derivatives which have a good antistatic effect on polyamides when used alone are particularly suitable for use, in combination with the carboxylic acid amides, according to the invention.

The invention will now be explained with the aid of Examples.

The relative viscosities indicated refer to a 1 % solution of the polyamide in m-cresol at 25°C.

The electrical surface resistance was measured with a high resistance ohmmeter on fibers after removal of the spinning preparation by washing at 60°C in a solution of 5 g per liter of an alkaline detergent, drying and 48 hours conditioning in a standard atmosphere of 50 % relative humidity at 23°C. The washings and measurements were carried out 10 times.

To determine the resistance to yellowing, the degree of whiteness of the fibers was measured after various periods at 140°C.

The results obtained from determinations of the degree of whiteness of the three types of filaments are summarized in Table 1.

Table 1

| Additive | Original value | 1 hour at 140°C | 3 hours at 140°C |
|---|---|---|---|
| Polyether alone | 80.9 | 19.4 | 1.5 |
| Amide alone | 81.2 | 63.1 | 43.2 |
| Polyether and amide | 81.9 | 62.2 | 50.3 |

Examples 2–12 are summarized in Table 2.

Table 2

| Example | Carboxylic acid amide of | Polyoxyalkylene compound | Surface resistance[Ω] 1st washing | Surface resistance[Ω] 10th washing | Degree of whiteness Original | Degree of whiteness 1 hour at 140°C | Degree of whiteness 3 hours at 140°C |
|---|---|---|---|---|---|---|---|
| 2 | Stearic acid and N-methyl stearylamine | Stearyl alcohol 20 EO | $3 \times 10^{10}$ | $8 \times 10^{10}$ | 80.3 | 63.1 | 45.3 |
| 3 | Lauric acid and N-isopropyl-diaminohexane | Stearyl alcohol 20 EO | $8 \times 10^{9}$ | $5 \times 10^{10}$ | 79.4 | 62.2 | 50.3 |
| 4* | Lauric acid and N-isopropyl-diaminohexane | Stearic acid 23 EO | $4 \times 10^{10}$ | $1 \times 10^{11}$ | 79.1 | 59.8 | 49.8 |
| 5 | First runnings acid of coconut oil and N-isopropyl-diaminohexane | Polyethylene glycol MW=20,000 | $9 \times 10^{9}$ | $4 \times 10^{10}$ | 77.1 | 61.0 | 43.2 |
| 6 | First runnings acid of coconut oil and N,N'-diisopropyl-diaminohexane | i-nonyl phenol-20 EO-$(CH_{23})SO_3Na$ | $1 \times 10^{10}$ | $4 \times 10^{10}$ | 80.9 | 57.7 | 51.9 |
| 7* | Myristic acid and N,N'-dibenzyl-diaminohexane | i-nonyl phenol 20 EO | $3 \times 10^{10}$ | $2 \times 10^{11}$ | 81.9 | 62.9 | 53.3 |
| 8 | Palmitic acid and N,N',N''-trimethyl diethylene triamine | Lauryl alcohol 3 EO sulphate | $8 \times 10^{9}$ $3 \times 10^{10}$ | 80.1 | 61.8 | 46.8 | |
| 9* | Lauric acid and piperazine | Stearyl alcohol 20 EO | $5 \times 10^{10}$ | $1 \times 10^{11}$ | 79.8 | 61.8 | 48.9 |
| 10 | First runnings acid of coconut oil and N-isopropyl-diaminohexane | Stearyl alcohol 20 EO | $1 \times 10^{10}$ | $7 \times 10^{10}$ | 80.0 | 57.9 | 50.6 |
| 11 | Lauric acid and N,N'-diisopropyl-diaminohexane | Oleyl alcohol 20 EO | $1 \times 10^{10}$ | $5 \times 10^{10}$ | 80.2 | 58.8 | 50.8 |
| 12 | Lauric acid and N-methyl-dodecylamine | Stearic acid 23 EO | $3 \times 10^{10}$ | $9 \times 10^{10}$ | 81.0 | 62.9 | 45.7 |

*Addition of 1 %, by weight to polycaprolactam or polyamide-66

The following Examples are to further illustrate the invention without limiting it.

EXAMPLE 1

A polycaprolactam melt, ($\eta_{rel.} = 2.60$), in which 1 %, by weight, of a 20-fold ethoxylated oleyl alcohol is already homogeneously distributed is mixed with 1 %, by weight, based on the polycaprolactam, of N,N'-dilauroyl-N-isopropyl-diamino-hexane by adding the latter from a feed screw to the polycaprolactam which is in a double shaft extruder. The mixture is spun to form filaments of dtex 100 f 25. The electrical surface resistance of the stretched material is $9 \times 10^{9}$ ohm after the first washing and $2 \times 10^{10}$ ohm after the 10th washing.

COMPARISON EXAMPLE 1

Filaments with a titer of dtex 100 f 25, manufactured as in Example 1, containing only 2 %, by weight, of the 20-fold ethoxylated oleyl alcohol is found to have a surface resistance of $8 \times 10^{10}$ ohm after the first washing and $2 \times 10^{11}$ ohm after the 10th washing.

COMPARISON EXAMPLE 2

When using a polyether-free granulate to which only 2 %, by weight, of N,N'-dilauroyl-N-isopropyl-diaminohexane has been added in the manner described above, the filaments obtained have a surface resistance of $8 \times 10^{11}$ ohm after the first washing and $2 \times 10^{12}$ ohm after the 10th washing.

We claim:
1. Antistatic polyamide compound which has been stabilized against yellowing caused by the action of heat, comprising an aliphatic polyamide having recurrent structural units corresponding to one of the following general formulae:

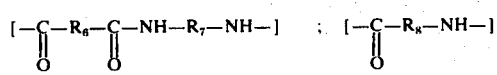

wherein
$R_6$ denotes a straight or branched chain $C_4$–$C_{20}$ alkylene group,
$R_7$ denotes a straight or branched chain alkylene group, a cyclohexylene group or

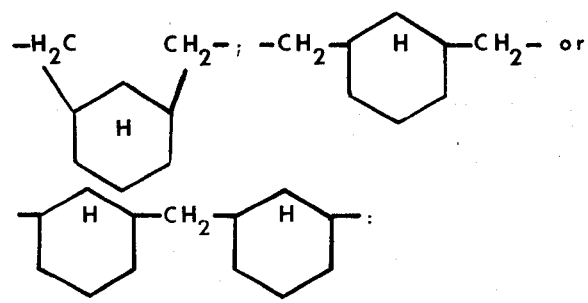

and

R$_8$ denotes a straight or branched chain C$_3$–C$_{20}$ alkylene group which contains at least one polyoxyalkylene compound in an amount up to 7%, by weight, and from 0.1 to 7%, by weight, of a carboxylic acid amide corresponding to one of the following general formulae:

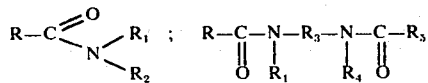

wherein
R and R$_5$ represent the same or different C$_4$–C$_{24}$ alkyl groups,
R$_1$ represents a C$_6$–C$_{24}$ alkyl group,
R$_2$ represents a C$_6$–C$_{24}$ alkyl group,
R$_3$ represents a C$_1$–C$_6$ alkylene group, and
R$_4$ represents hydrogen or a C$_1$–C$_5$ alkyl group.

2. Polyamide compound according to claim 1, wherein the polyoxyalkylene compound is a polyethylene glycol, an ethoxylated alcohol, an ethoxylated carboxylic acid, an ethoxylated amine or an ethoxylated phenol.

3. Polyamide compound according to claim 1, wherein the polyoxyalkylene compound contains sulphate, sulphonate or amino salt end groups.

4. The unpigmented compound of claim 1.

5. Threads and sheets of polyamide compounds according to claim 1.

6. Process for producing antistatic polyamide compounds which are stabilized against yellowing caused by the action of heat, wherein at least one polyoxyalkylene compound in an amount up to 7% by weight, and from 0.1 to 7%, by weight, of carboxylic acid amides corresponding to one of the general formulae:

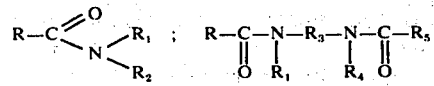

wherein R, R$_1$, R$_2$, R$_3$, R$_4$, and R$_5$ are as defined in claim 1, are added to melts of linear aliphatic polyamides having recurrent structural units corresponding to one of the following general formulae:

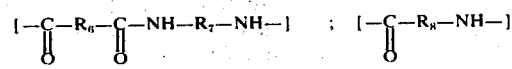

wherein
R$_6$ denotes a straight or branched chain C$_4$–C$_{20$} alkylene group,
R$_7$ denotes a straight or branched chain alkylene group, a cyclohexylene group or

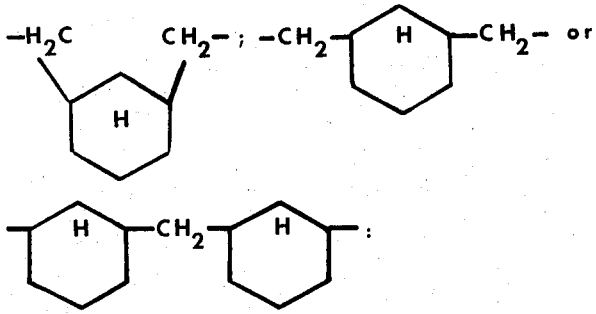

and
R$_8$ denotes a straight or branched chain C$_3$–C$_{20}$ alkylene group.

7. Process according to claim 6 wherein the polyoxyalkylene compound is added to the monomers before preparation of the polyamide.

8. Process according to claim 6, wherein the polyoxyalkylene compound is a polyethylene glycol, an ethoxylated alcohol, an ethoxylated carboxylic acid, an ethoxylated amine or an ethoxylated phenol.

9. Process according to claim 6, wherein the polyoxyalkylene compound contains sulphate, sulphonate or amine salt end groups.

* * * * *

UNITED STATES PATENT AND TRADEMARK OFFICE
CERTIFICATE OF CORRECTION

PATENT NO. : 3,962,176

DATED : June 8, 1976

INVENTOR(S) : Claus-Rudiger Bernert et al

It is certified that error appears in the above-identified patent and that said Letters Patent are hereby corrected as shown below:

Column 1, line 40, "titer" should be ---titre---

Column 3, line 4, after compounds ---2. The polyether content...--- should start a new paragraph.

Column 5, line 6, "liter" should read ---litre---.

Column 5 and 6, Table 2, Example 8 starting with 1st Washing and extending over to the 3 hours at 140°C each one of the numbers starting with --- $10$ $3\times10$ ---should each be moved over one space.

Column 5, line 57, "titer" should be ---titre---.

Signed and Sealed this

Twenty-sixth Day of April 1977

[SEAL]

Attest:

RUTH C. MASON
*Attesting Officer*

C. MARSHALL DANN
*Commissioner of Patents and Trademarks*